United States Patent
Petermann (10) Patent No.: US 12,203,740 B2
(45) Date of Patent: Jan. 21, 2025

(54) THz MEASURING AND THz MEASURING DEVICE FOR MEASURING A CORRUGATED PIPE

(71) Applicant: CiTEX Holding GmbH, Melle (DE)

(72) Inventor: Jan Hendrik Petermann, Melle (DE)

(73) Assignee: CiTEX Holding GmbH, Melle (DE)

( * ) Notice: Subject to any disclaimer, the term of this patent is extended or adjusted under 35 U.S.C. 154(b) by 219 days.

(21) Appl. No.: 18/084,878

(22) Filed: Dec. 20, 2022

(65) Prior Publication Data
US 2023/0194243 A1   Jun. 22, 2023

(30) Foreign Application Priority Data
Dec. 22, 2021 (DE) .................. 10 2021 134 22.8

(51) Int. Cl.
| | |
|---|---|
| G01B 11/06 | (2006.01) |
| G01B 11/04 | (2006.01) |
| G01B 11/10 | (2006.01) |
| G01S 7/35 | (2006.01) |

(52) U.S. Cl.
CPC ........ *G01B 11/0691* (2013.01); *G01B 11/046* (2013.01); *G01B 11/10* (2013.01); *G01S 7/352* (2013.01)

(58) Field of Classification Search
CPC ... G01B 11/0691; G01B 11/046; G01B 11/10; G01N 21/952; G01N 21/3581; G01N 21/3563; G01S 7/352
See application file for complete search history.

(56) References Cited

U.S. PATENT DOCUMENTS

| | | | |
|---|---|---|---|
| 2007/0034813 A1 | 2/2007 | Shen | |
| 2019/0301853 A1* | 10/2019 | Klose | ................. G01N 21/3581 |
| 2022/0146251 A1 | 5/2022 | Böhm | |

FOREIGN PATENT DOCUMENTS

| | | |
|---|---|---|
| DE | 102018124175 A1 | 4/2020 |
| DE | 102019108299 A1 | 10/2020 |
| DE | 102020133704 A1 | 6/2022 |
| EP | 3265748 B1 | 7/2020 |
| WO | 2016139155 A1 | 9/2016 |

OTHER PUBLICATIONS

Klier et al., "Four-channel terahertz time-domain spectroscopy system for industrial pipe inspection" IEEE, 2018, 2 pages.
Hauck et al., "Industrielle Prozesswanddickenmessung in der Kunststoffrohrextrusion mittels zeitaufgeloster Terahertz-Systeme" DGZfp-Jahrestagung 2013, Poster 27, 18 pages, English machine translation included.
Kocic et al., "Lenses for terahertz applications: Development of new materials and production processes" AIP Conference Proceedings 1593, 416-419, 2014, 5 pages.

* cited by examiner

*Primary Examiner* — Abdullahi Nur
(74) *Attorney, Agent, or Firm* — Barnes & Thornburg LLP (57) ABSTRACT

The present disclosure relates to a THz measuring method and a THz measuring device for measuring corrugated pipes with different diameters, wave widths and valley widths.

20 Claims, 2 Drawing Sheets

THz MEASURING AND THz MEASURING DEVICE FOR MEASURING A CORRUGATED PIPE

PRIORITY CLAIM

This application claims priority to German Patent Application No. DE10202113422.8, filed Dec. 22, 2021, which is expressly incorporated by reference herein.

BACKGROUND

The present disclosure relates to a THz measuring method and a THz measuring device for measuring a corrugated pipe.

SUMMARY

According to the present disclosure, a THz measuring device may be used for carrying out a THz measuring method. The THz measuring method may be carried out, in particular, using a THz measuring device.

In illustrative embodiments, at least one transceiver unit is provided which comprises a THz transceiver and an upstream lens. The THz transceiver can carry out a direct time-of-flight measurement, further also a frequency modulation of the Thz transmission beams, and/or put out pulsed THz radiation.

In illustrative embodiments, the frequency of the THz radiation may be in the GHz and THZ band, e.g., in a region between 10 GHz and 50 THz, in particular, 20 GHz and 10 THz, in particular 50 GHz and 10 THz. Thus, the THz radiation may also lie in a frequency range of microwave radiation, millimeter waves- and/or radar radiation.

In illustrative embodiments, an FMCW radar is used which puts out a continuous, frequency modulated transmission beam.

The term THz transceiver designates a combination of a THz transmitter (THz Transmitter) and a THz receiver (THz-Receiver), whereby these may be designed as a common physical unit, e.g., combined oscillating circuit, however, also with separate design for transmitter and receiver, e.g., coupled via a semi-transparent mirror.

In illustrative embodiments, a corrugated pipe is transported along an axis of symmetry of the THz measuring device and continuously measured by the THz measuring device. Hereby, the THz measuring device comprises a housing and at least one transceiver unit, the optical axis of which is directed towards the axis of symmetry and emits the THz radiation as convergent beam of rays, where the focal length, i.e., the distance of a measuring spot or, respectively, focal spot from the transceiver unit, is advantageously smaller than a measuring distance of the transceiver unit from the axis of symmetry. Thus, the beam of rays is focused onto the focal spot or, respectively, measuring spot even prior to reaching the optical axis.

In illustrative embodiments, a special ratio between focal length and measuring distance is provided, thus describing a suitable beam geometry. Hereby, preferably, a ratio of focal length to measuring distance in a range of at least 60 percent is provided, preferably at least 75 percent, in particular, at least 80%.

In illustrative embodiments, the ratio of focal length to measuring distance may be e.g., in a range of 60 to 90 percent, in particular in a range between 75 and 90 percent, e.g., at 80 to 90 percent.

In illustrative embodiments, a narrow beam of rays can be formed which allows for an advantageous measuring of waves and valleys of typical corrugated pipes of various sizes, without focusing or changing the measuring distance because, in particular, larger corrugated pipes also comprise larger structures.

In illustrative embodiments, the beam geometry may also be described by the convergence angle of the emitted beam of rays, i.e., the opening angle of the beam of rays towards the optical axis. Hereby, it becomes apparent that, according to the present disclosure, advantageously, a convergence angle of 1° to 5°, e.g., 1° to 4°, preferably 1.5° to 3°, e.g., in a range between 1.8 and 2.3° is formed, which describes the suitable, narrow beam of rays.

In illustrative embodiments, a measuring device and/or a measuring method is created, wherein a ratio of focal length to measuring distance lies in a range of at least 60 percent, preferably at least 75 percent, in particular at least 80 percent, and/or a convergence angle of 1 degree to 5 degrees, e.g., 1 degree to 4 degrees, preferably 1.5 degrees to 3 degrees, e.g., in a range between 1.8 and 2.3 degrees, is created.

Instead of by means of the convergence angle the beam geometry may also be described by the numerical aperture. This description is advantageous, because it takes into consideration the refraction index of the lens material. The numerical aperture correspondingly results as the sine of the convergence angle in air.

Owing to the narrow convergent beam of rays it is possible to measure a corrugated pipe with its valleys and waves, whereby the waves and valleys can be separately detected without being affected by the adjacent valley or, respectively, the adjacent wave. Thus, the structural values, i.e., in particular, layer thicknesses of the waves and valleys, along the transport direction or, respectively, the axis of symmetry, can be clearly separated and determined. In particular, corrugated pipes of different diameters can be measured using a fixed beam geometry, i.e., in particular, without focusing onto the pipe surface and without adjusting the measuring distance.

As layer thicknesses or, respectively, structuring in a radial direction of the corrugated pipe, in particular, the following may be determined:

a valley wall thickness of the valleys of the corrugated pipe, a wave wall thickness of the waves of the corrugated pipe, In the case of a pipe with enclosed hollow chambers or, respectively, with an interior pipe, an exterior wave wall thickness and/or interior wave wall thickness, a wave height of the waves compared to the valleys or, respectively, a height of the hollow chambers.

Further, structural widths, i.e., wave widths and valley widths can be determined, in that the measuring distances of the individual structures of the corrugated pipe in relation to the transceiver unit are determined, i.e., as distances in the measuring plane, and the wave height as difference of the measuring distance of a wave to the measuring distance of a valley is determined;

further, interior and exterior diameters can be determined.

In illustrative embodiments, the selection of a material of the lens with high refraction index, in particular, a refraction index of n>1.7, e.g., in a range between 1.7 and 2.1, in particular, 1.7 and 2.0, preferably 1.8 and 2.0, each in the frequency range of the emitted THz radiation, is advantageous because, when using such a material with a large refraction index, it is possible to create a measuring spot with a small measuring spot diameter.

The beam geometry can suitably be determined by the suitable numerical aperture, again, with the high refraction index of the material of the lens is advantageous for focusing the radiation emitted from the transceiver.

Hereby, according to the present disclosure, it is recognized, in particular, that the size of the measuring spot depends upon the aperture, i.e., the diameter of the lens, the focal length and also the refraction index of the material. Thus, by selecting a suitable material it is possible to form a suitable beam geometry allowing for a secure and sufficient measuring of corrugated pipes. When utilizing a lens having a high refraction index, in particular the THz transceiver may be designed as an FMCW radar sensor which, being a dipole or, respectively, oscillating circuit, has a wide emission characteristic or, respectively, a wide emitting angle, so that the lens allows for focusing and bundling onto the structures of the corrugated pipe in spite of the wide emitting angle.

Thus, according to the present disclosure, it is recognized that it is problematic to use a smaller refraction index and to limit the radiation by means of e.g., a smaller aperture so as to attain a resolution of the structures of the corrugated pipe, since a small aperture does not produce a sufficient small beam ray or beam bundle, and the beam therefore converges again after a short distance after the aperture. Hereby, the aperture is the opening of the optics limiting the radiation, whereby at the aperture, in principle, the effect of diffraction of the radiation occurs, in particular, since the THz radiation is relatively longwave, in particular, compared to e.g., optical radiation. Thus, with the THz radiation at the edges of the aperture, in principle, there is more relevant diffraction occurring. By utilizing the material of the lens or, respectively, optics with a high refraction index such problems can be avoided or, respectively, kept at a minimum. Thus, in the case of a material with a larger refraction index larger apertures can be used which form no relevant diffraction effects so that the resolution of the structures of the corrugated pipe, i.e., in particular, the separate detection of waves and valleys is improved as a consequence and not adversely affected by diffraction effects to a relevant extent.

As a material of the lens, in particular, a material containing silicon dioxide, preferably quartz glass, may be used, which has a refraction index between 1.8 and 2, e.g., 1.995, because such a quartz glass exhibits highly advantageous properties; besides the high refraction index the absorption is also smaller, whereby, in principle, methods of manufacturing lenses with quartz glass may be used for other lens forms in optical devices such as lasers and light sources. However, quartz glass has not been used previously in connection with Terahertz radiation, in particular in THz measuring devices, for measuring distances in the production of continuously transported measured objects.

The measuring distance may be e.g., between 200 mm and 1300 mm, the lens may have e.g., a diameter between 60 and 90 mm, e.g., approximately 85 mm, so as to create a suitable beam geometry.

Thus, a secure measuring is made possible with little effort.

Preferably, corrugated pipes with different diameters and different structure widths can be measured using the same THz measuring device without changing the focusing, i.e., readjusting the transceiver units or lenses relative to the axis of symmetry. Hereby, it is recognized that corrugated pipes with differing diameters generally also exhibit differing structure widths such that a corrugated pipe with a larger diameter also features larger structure widths, i.e. larger valley widths and larger wave widths, since the realization of smaller structure widths, for one thing, uses more material, and, for another, reduces the flexibility or, respectively, adjustability, so that for different corrugated pipes a common suitable convergent beam of rays can be formed.

Because the transceiver units are designed with a fixed measuring distance of the transceiver units to the axis of symmetry, i.e., without active focusing means or, respectively, adjustment in a radial direction relative to the axis of symmetry, the THz measuring device can be realized at little cost and in a stabile manner. Thus, the measuring values are unambiguous and reproducible because they do not depend on the exact adjustment of length dimensions. Moreover, no respective adaptation to different corrugated pipes is required. It is possible, in particular, to transport and measure different corrugated pipes by means of a common THz measuring device without changing the settings.

In illustrative embodiments, an adjustment of the entire THz measuring device, i.e., the housing with the one or more THz transceivers can be carried out relative to the measured object, i.e., in the measuring plane, e.g., by means of a so-called cross table allowing a translational adjustment of the measuring device in the measuring plane relative to the measured object which is transported by a separate conveyor means.

According to an advantageous embodiment, a plurality of THz transceivers with equal focal length, in particular, with equal THz transceiver units, are arranged on the common housing in the circumferential direction around the measuring space and aligned towards the common axis of symmetry, whereby, advantageously, a fully circumferential measuring of a corrugated pipe contained therein, i.e., in particular, of corrugated pipes with different diameters and structure widths, is made possible.

According to an embodiment alternative hereto, one or more transceiver units are provided on the housing rotating in the circumferential direction, i.e. fully circumferential, or reversing within an angular range, i.e. swiveling back and forth, always with a constant measuring distance of the transceiver units to the axis of symmetry.

Thus, in principle, according to one embodiment, a method is provided in which during the measuring of the corrugated pipe the at least one transceiver unit rotates or reverses in the circumferential direction around the axis of symmetry, at a fixed measuring distance.

Accordingly, according to one embodiment, a measuring device is provided in which one or more transceiver unit(s) are arranged on the housing of the device circumferentially, in the circumferential direction, around the axis of symmetry, and a rotational drive is provided which is designed to continuously rotate the one or more transceiver unit(s) around the axis of symmetry, or swivel them back and forth reversing along a curve section around the axis of symmetry.

Preferably, the distances of opposite transceiver units are predetermined in advance or are determined in advance by a calibration measurement with an empty measuring space. Advantageously, in addition to the structure values also material data or, respectively, the refraction index of the material of the corrugated pipe is determined, in particular, on the basis of a calibration measurement with an empty measuring space and subsequent measuring with a corrugated pipe contained inside.

According to a further development, in addition to the transceiver units a distance measurement can be carried out by means of a detection means in which a position or a distance of an exterior surface of the corrugated pipe is detected, e.g., by means of a laser measuring device or, respectively, LIDAR, furthermore, also again by means of a radar, in particular an FMCW radar. Thus, this measurement merely serves to detect the exterior surface and the distance, not the above-described determination of the structures of the corrugated pipes contained inside. Such a detection merely determining the exterior surface of the corrugated pipe already allows for an unambiguous allocation and detection of structure positions. In principle, however, such an additional detection unit is not required.

According to the present disclosure, in particular, corrugated pipes with an interior diameter from 150 mm and up to an exterior diameter of 1,800 mm, or in an intermediate range in-between can be measured. According to an advantageous embodiment, corrugated pipes with an interior diameter between 150 mm up to an exterior diameter of 1,200 mm, or in an intermediate range are measured. According to an embodiment preferable hereto, corrugated pipes with an interior diameter from 500 mm up to an exterior diameter of 1,800 mm, or in an intermediate range are measured.

Thus, corrugated pipes with dimensions common in the industrial sector can be detected and precisely measured using a single THz measuring device. The determined wave and valley widths as well as wave heights can be compared to threshold values, and, upon exceeding a threshold value an error signal can be put out.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 2:
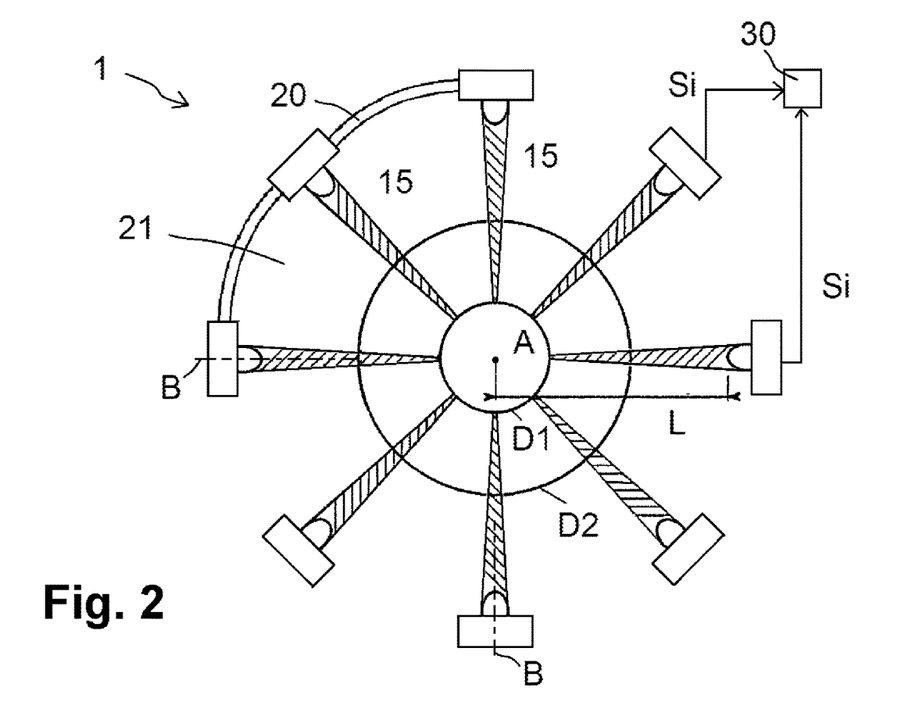
FIG. 2 shows a measuring device including several THz transceivers from FIG. 1 when measuring different corrugated pipes.

According to FIG. 2, a THz measuring device 1 several transceiver units 2 arranged in a circle around an axis of symmetry A and aligned onto the axis of symmetry A, each transceiver unit 2 comprising one THz transceiver 3 and an upstream lens 4. The THz transceiver 3 is designed as a transmitter and receiver unit and can, according to an advantageous embodiment, emit THz radiation 5 continuously, frequency modulated or temporally interrupted or, respectively, pulsed. Thus, the THz transceiver 3 can e.g., emit the THz radiation 5 frequency modulated (frequency modulated continuous wave radar sensor, FMCW sensor) and detect reflected radiation 7. Besides fully electronic systems, the use of optical THz transceivers with e.g., short pulse lasers is also possible.

The THz transceiver 3 puts out the THz radiation 5 initially in a wide emission angle; subsequently the THz radiation 5 is focused along the optical axis B by the lens 4. To that end, the lens 4 is designed half-convex or, respectively, convex towards the side of the emission and focuses the THz radiation 5 emitted from the THz transceiver 3 in a focal length f thereby forming a measuring spot 6. The size or, respectively, the diameter d6 of the focal spot 6 depends, among other things, on the aperture, i.e., the diameter d4 of the lens 4, a refraction index n4 of the lens 4, and the focal length f.

The THz radiation 5 is emitted e.g., in a range between 50 GHZ and 4 THz. The lens 4 made from a material of high index for the THz radiation 5, i.e. having a high refraction index n4, which in this frequency range lies at n>1.7, e.g., n=1.8 to 2.0, e.g., n~1.9. The material of the lens 4 may be, in particular, quartz glass. Thus, a long focal length f and, in particular, a focal spot with a small diameter d6 is formed.

The measuring distance L may lie e.g., between 200 mm or 650 mm and 1300 mm, the lens 4 may have e.g., a diameter of 60 to 90 mm, e.g., about 85 mm so as to create a suitable beam geometry. The ratio of focal length f to measuring distance L will preferably lie within a range of at least 60 percent, in particular at least 75 percent, e.g., at least 80.

The THz measuring device 1 serves to measure corrugated pipes 8 of different diameters D1, D2 and structure widths, i.e., valley widths T1, T2 and wave widths W1, W2. The corrugated pipes comprise circumferential or helical alternating waves 10 and valleys 11 auf with a pipe axis which, when positioned ideally, corresponds to the axis of symmetry A. Further, the corrugated pipes 8 may comprise additional structures, e.g., fittings, which can also be detected accordingly.

Figure 1:
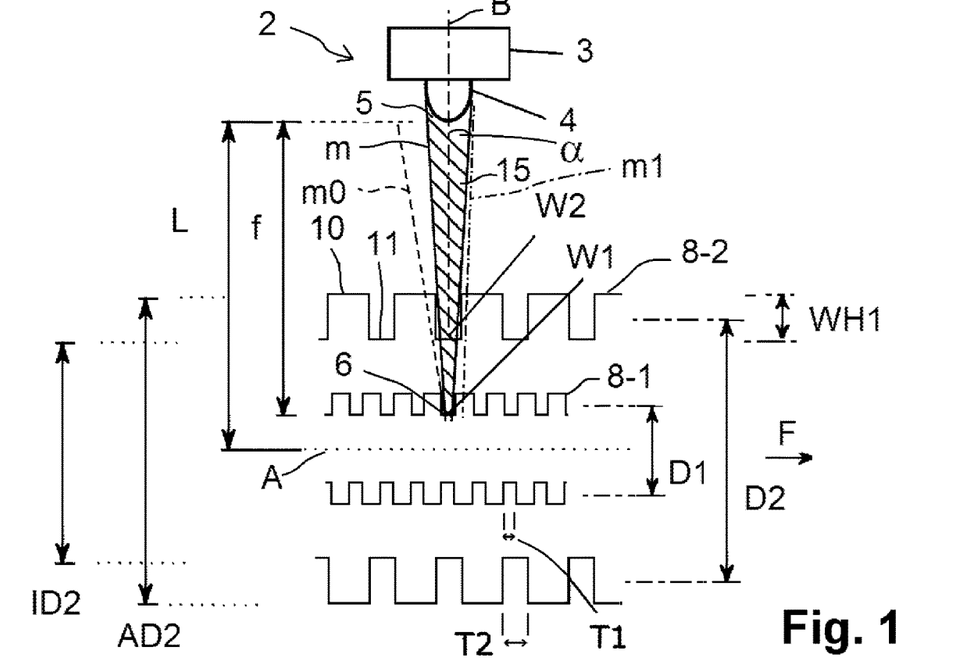
FIG. 1 shows a transceiver unit when measuring two corrugated pipes with different diameters and structure widths.

Thus, in FIG. 1, a first corrugated pipe 8-1 is provided, with a smaller diameter D1 and smaller structure width, i.e., smaller valley width T1 and smaller wave width W1, with its pipe axis on the axis of symmetry A, and a larger second corrugated pipe 8-2 with a larger diameter D2 and larger structure width, i.e., larger valley width T2 and larger wave width W2.

Because the structure width, i.e., wave width W and valley width T, decreases with the diameter, it follows that the suitable, as shown here, focusing of the THz radiation 5 as a converging beam of rays 15 is formed in that, in the shown corrugated pipes 8-1 and 8-2 according to FIG. 1, always the valleys 11 can be covered by the beam of rays 15 without the beam of rays 15 covering the adjacent wave 10, and, similarly, the wave 10 without the adjacent valley 11. Hereby, in FIG. 1, the marginal beam m of the beam of rays 15 is drawn in, and, for comparison in a dotted line, a marginal beam m0 of a beam optics without the embodiment of the narrow, convergent beam of rays 15; thus, the marginal beam m0 intersects with the waves 10 of the larger corrugated pipe 8-2, or it fails to extend up to the valleys 11 of the smaller corrugated pipe 8-1. Additionally, a chain dotted line m1 is provided for comparison, in order to describe a marginal beam as a beam of the same lens size, but lower diffraction index. The marginal beam m1 results in a larger focus, which is not usable to resolve the structures of the smaller corrugated pipes 8-2.

Furthermore, the beam geometry may also be described by the convergence angle α (alpha) of the emitted beam of rays, i.e., the opening angle of the beam of rays or, respectively, of the marginal beam m in relation to the optical axis B. Here, it becomes apparent that, according to the present disclosure, advantageously, a convergence angle α of 1° to 5°, e.g., 1° to 4°, preferably 1.5° to 3°, e.g., is formed in the range of 1.8 to 2.3° which describes the suitable, narrow beam of rays 15.

Thus, the embodiment of a measuring signal Si (t) of the THz transceivers 3 as a temporal function during transport of the corrugated pipes 8-1 and 8-2 in a transport direction F is made possible, wherein the valleys 11 can be detected alone, at least at certain times, and measuring peaks of the valleys 11 can be formed without affecting the adjacent waves 10 and, correspondingly, measuring peaks of the waves 10 without affecting the adjacent valleys 11. In-between these measuring peaks intermediate regions of the signal Si are formed, in which the beam of rays 15 covers both a wave 10 as well as the adjacent valley 11.

Thus, upon transporting the corrugated pipe 8-1 or 8-2 in the transport direction F the measuring distances of both the waves 10 as well as the valleys 11 in relation to the transceiver unit 2 can be continuously detected along the optical axis B, and, thus, from this, the exterior diameter AD and the interior diameter ID, as well as the average diameter D of the respective corrugated pipe 8-1 and 8-2 can be determined, or, respectively, the wave height WH1, WH2 as the difference of the measuring distances of the waves 10 and the valleys 11, can be determined directly from the measuring signal Si.

Hereby, upon measuring the different corrugated pipes 8-1 and 8-2, active focusing by adjusting the measuring distance L, i.e. transceiver units 2 relative to the axis of symmetry A is not provided, where, thus, according to FIG. 2, the individual transceiver units 2 are moved towards or, respectively, away from one another, and/or an adjustment of the lenses 4 in relation to the transceivers 3. Thus, the transceiver units 2 are e.g., rigidly contained in a common housing 20 and are never adjusted relative to the housing 20, neither during transport of the individual corrugated pipes 8-1, 8-2 in the transport direction F, nor upon changing the measured object, i.e., the measuring of the respectively other corrugated pipe 8-1 or, respectively, 8-2.

The housing 20 and therewith the entire THz measuring device 1 can be adjusted in relation to the respective corrugated pipe 8-1, 8-2, i.e. without relative adjustment of the transceiver units 2 in relation to one another. This is helpful, in particular, in the case of a bending corrugated pipe 8-1 or, respectively, 8-2, which changes relative to the axis of symmetry A of the THz measuring device 1. Thus, the THz measuring device 1 in its entirety is re-adjusted translationally in the shown measuring plane of FIG. 2 perpendicular to the axis of symmetry A; this can be carried out, in particular, by means of a so-called cross table.

Thus, it is possible to determine from the measuring signal Si whether there is a regular structure, i.e., with structure widths of T1, T2 or, respectively, W1, W2 and wave heights WH1, WH2, and an error signal and/or measuring signal can be put out which is also used to regulate, i.e., to adjust the extruder and/or corrugator.

Figure 3:
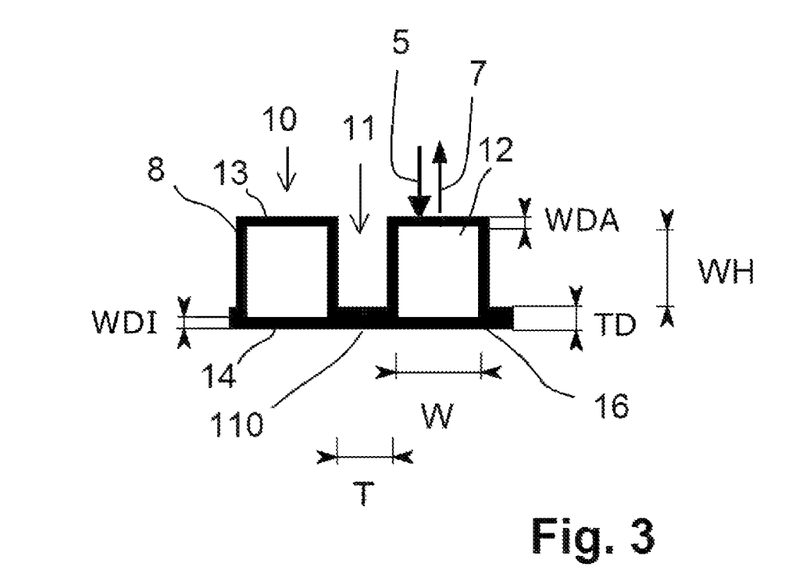
FIG. 3 shows an enlarged representation when measuring a corrugated pipe with an inner pipe.

FIG. 3 shows the measuring of a corrugated pipe 8 in an enlarged representation, whereby, according to the embodiment shown here, a corrugated pipe 8 is shown in which the waves 10 form closed hollow chambers 12, i.e., the wave 10 exhibits an exterior wave wall 13, an interior wave wall 14 and in-between a hollow chamber 12. Thus, with this corrugated pipe 8, which is suitable, in particular, for conducting fluids, a continuous inner pipe 16 is formed. However, the representation may also be applied similarly to corrugated pipes 8 without an interior wave wall 14.

According to FIG. 3, the THz radiation 5 is reflected at the boundary surfaces of the layers and the reflected radiation 7 is subsequently detected. Thus, in a valley Tal 11 a reflection appears at the upper side and lower side of the valley wall 110 so that a valley wall thickness TD of the corrugated pipe 8 can be determined as time-of-flight difference or, respectively, e.g., correspondingly by frequency modulation.

Furthermore, an exterior wall wave wall thickness WDA and an interior wall wave wall thickness WDI of the corrugated pipe 8 are determined, moreover, a wave height WH can be determined as an air layer.

Thus, in a corrugated pipe 8 without an inner pipe 16 the valley wall thickness TD and the exterior wave wall thickness WDA, shown here, are measured, which therefore represents the wave wall thickness.

Thus, the further structure parameters W and T can be determined in addition.

Corrugated pipes made of plastics or other thermoplastic materials have a structure consisting of alternating waves and valleys (elevations and troughs), possibly with additional structures, and serve, in particular, for improving lines and cables as well as for transporting fluids. By virtue of the corrugation the corrugated pipes are highly bendable and flexible while retaining a high degree of stiffness against acting forces, in particular, loads perpendicular to its longitudinal axis. Corrugated pipes for transport purposes generally comprise a continuous interior pipe so that an air chamber is formed between a wave (crest) and the interior pipe. The waves and valleys may, in particular, be circumferential in the peripheral direction or even helical. The corrugated pipes with their structures are generally made using an extruder and a downstream wave-shaping corrugator. Measuring corrugated pipes is generally complex because the structures are formed at differing distances from the pipe axis.

THz measurements of pipes allow contactless measuring of distances, diameters, layer thicknesses and structures, in that a THz beam is collimated and passes through the pipe, whereby it is reflected at boundary surfaces of the pipe material. In some comparative instances, the Thz transmission beam is focused onto a pipe axis of the pipe, e.g., to allow measurement of a front and rear wall region of the pipe.

A comparative device and comparative method for measuring the diameter and/or the wall thickness of a strand, wherein a reflector for terahertz radiation is arranged opposite to at least one transmitter and is arranged behind the strand in the radiation direction of the terahertz radiation.

The present disclosure is based on the object of creating a THz measuring method and a THz measuring device allowing for secure measurements of continuously passing corrugated pipes with little expenditure.

This task is solved by a THz measuring method and a THz measuring device according to the independent claims. The sub-claims describe preferred further developments.

The THz measuring device according to the present disclosure is provided, in particular, for carrying out a THz measuring method according to the present disclosure. The THz measuring method according to the present disclosure may be carried out, in particular, using a THz measuring device according to the present disclosure.

Thus, at least one transceiver unit is provided which comprises a THz transceiver and an upstream lens. The THz transceiver can carry out a direct time-of-flight measurement, further also a frequency modulation of the Thz transmission beams, and/or put out pulsed THz radiation.

The frequency of the THz radiation may be in the GHz and THZ band, e.g., in a region between 10 GHz and 50 THz, in particular, 20 GHz and 10 THz, in particular 50 GHz and 10 THz. Thus, the THz radiation may also lie in a frequency range of microwave radiation, millimeter waves- and/or radar radiation.

According to a preferred embodiment, an FMCW radar is used which puts out a continuous, frequency modulated transmission beam.

The term THz transceiver designates a combination of a THz transmitter (THz Transmitter) and a THz receiver (THz-Receiver), whereby these may be designed as a common physical unit, e.g., combined oscillating circuit, however, also with separate design for transmitter and receiver, e.g., coupled via a semi-transparent mirror.

Thus, a corrugated pipe is transported along an axis of symmetry of the THz measuring device and continuously measured by the THz measuring device. Hereby, the THz measuring device comprises a housing and at least one transceiver unit, the optical axis of which is directed towards the axis of symmetry and emits the THz radiation as convergent beam of rays, where the focal length, i.e., the distance of a measuring spot or, respectively, focal spot from the transceiver unit, is advantageously smaller than a measuring distance of the transceiver unit from the axis of symmetry. Thus, the beam of rays is focused onto the focal spot or, respectively, measuring spot even prior to reaching the optical axis.

The term "measuring distance" describes the distance of the transceiver unit from the axis of symmetry, which can also be described as system distance, i. e. the distance to the system center.

According to a preferred embodiment, a special ratio between focal length and measuring distance is provided, thus describing a suitable beam geometry. Hereby, preferably, a ratio of focal length to measuring distance in a range of at least 60 percent is provided, preferably at least 75 percent, in particular, at least 80%.

The ratio of focal length to measuring distance may be e.g., in a range of 60 to 90 percent, in particular in a range between 75 and 90 percent, e.g., at 80 to 90 percent.

Thus, a narrow beam of rays can be formed which allows for an advantageous measuring of waves and valleys of typical corrugated pipes of various sizes, without focusing or changing the measuring distance because, in particular, larger corrugated pipes also comprise larger structures.

Alternatively, or in addition hereto, the beam geometry may also be described by the convergence angle of the emitted beam of rays, i.e., the opening angle of the beam of rays towards the optical axis. Hereby, it becomes apparent that, according to the present disclosure, advantageously, a convergence angle of 1° to 5°, e.g., 1° to 4°, preferably 1.5° to 3°, e.g., in a range between 1.8 and 2.3° is formed, which describes the suitable, narrow beam of rays.

Thus, in particular, a measuring device and/or a measuring method is created, wherein a ratio of focal length to measuring distance lies in a range of at least 60 percent, preferably at least 75 percent, in particular at least 80 percent, and/or—a convergence angle of 1 degree to 5 degrees, e.g., 1 degree to 4 degrees, preferably 1.5 degrees to 3 degrees, e.g., in a range between 1.8 and 2.3 degrees, is created.

Instead of by means of the convergence angle the beam geometry may also be described by the numerical aperture. This description is advantageous, because it takes into consideration the refraction index of the lens material. The numerical aperture correspondingly results as the sine of the convergence angle in air.

Owing to the narrow convergent beam of rays it is possible to measure a corrugated pipe with its valleys and waves, whereby the waves and valleys can be separately detected without being affected by the adjacent valley or, respectively, the adjacent wave. Thus, the structural values, i.e., in particular, layer thicknesses of the waves and valleys, along the transport direction or, respectively, the axis of symmetry, can be clearly separated and determined. In particular, corrugated pipes of different diameters can be measured using a fixed beam geometry, i.e., in particular, without focusing onto the pipe surface and without adjusting the measuring distance.

As layer thicknesses or, respectively, structuring in a radial direction of the corrugated pipe, in particular, the following may be determined: a valley wall thickness of the valleys of the corrugated pipe, a wave wall thickness of the waves of the corrugated pipe, In the case of a pipe with enclosed hollow chambers or, respectively, with an interior pipe, an exterior wave wall thickness and/or interior wave wall thickness, a wave height of the waves compared to the valleys or, respectively, a height of the hollow chambers.

Further, structural widths, i.e., wave widths and valley widths can be determined, in that the measuring distances of the individual structures of the corrugated pipe in relation to the transceiver unit are determined, i.e., as distances in the measuring plane, and the wave height as difference of the measuring distance of a wave to the measuring distance of a valley is determined;

further, interior and exterior diameters can be determined.

Hereby, it is apparent that, in particular, the selection of a material of the lens with high refraction index, in particular, a refraction index of n>1.7, e.g., in a range between 1.7 and 2.1, in particular, 1.7 and 2.0, preferably 1.8 and 2.0, each in the frequency range of the emitted THz radiation, is advantageous because, when using such a material with a large refraction index, it is possible to create a measuring spot with a small measuring spot diameter.

The beam geometry can suitably be determined by the suitable numerical aperture, again, with the high refraction index of the material of the lens is advantageous for focusing the radiation emitted from the transceiver.

Hereby, according to the present disclosure, it is recognized, in particular, that the size of the measuring spot depends upon the aperture, i.e., the diameter of the lens, the focal length and also the refraction index of the material. Thus, by selecting a suitable material it is possible to form a suitable beam geometry allowing for a secure and sufficient measuring of corrugated pipes. When utilizing a lens having a high refraction index, in particular the THz transceiver may be designed as an FMCW radar sensor which, being a dipole or, respectively, oscillating circuit, has a wide emission characteristic or, respectively, a wide emitting angle, so that the lens allows for focusing and bundling onto the structures of the corrugated pipe in spite of the wide emitting angle.

Thus, according to the present disclosure, it is recognized that it is problematic to use a smaller refraction index and to limit the radiation by means of e.g., a smaller aperture so as to attain a resolution of the structures of the corrugated pipe, since a small aperture does not produce a sufficient small beam ray or beam bundle, and the beam therefore converges again after a short distance after the aperture. Hereby, the aperture is the opening of the optics limiting the radiation, whereby at the aperture, in principle, the effect of diffraction of the radiation occurs, in particular, since the THz radiation is relatively longwave, in particular, compared to e.g., optical radiation. Thus, with the THz radiation at the edges of the aperture, in principle, there is more relevant diffraction occurring. By utilizing the material of the lens or, respectively, optics with a high refraction index such problens can be avoided or, respectively, kept at a minimum. Thus, in the case of a material with a larger refraction index larger apertures can be used which form no relevant diffraction effects so that the resolution of the structures of the corrugated pipe, i.e., in particular, the separate detection of waves and valleys is improved as a consequence and not adversely affected by diffraction effects to a relevant extent.

As a material of the lens, in particular, a material containing silicon dioxide, preferably quartz glass, may be used, which has a refraction index between 1.8 and 2, e.g., 1.995, because such a quartz glass exhibits highly advantageous properties; besides the high refraction index the absorption is also smaller, whereby, in principle, methods of manufacturing lenses with quartz glass may be used for other lens forms in optical devices such as lasers and light sources. However, quartz glass has not been used previously in connection with Terahertz radiation, in particular in THz measuring devices, for measuring distances in the production of continuously transported measured objects.

The measuring distance may be e.g., between 200 mm and 1300 mm, the lens may have e.g., a diameter between 60 and 90 mm, e.g., approximately 85 mm, so as to create a suitable beam geometry.

Thus, a secure measuring is made possible with little effort.

Preferably, corrugated pipes with different diameters and different structure widths can be measured using the same THz measuring device without changing the focusing, i.e., readjusting the transceiver units or lenses relative to the axis of symmetry. Hereby, it is recognized that corrugated pipes with differing diameters generally also exhibit differing structure widths such that a corrugated pipe with a larger diameter also features larger structure widths, i.e. larger valley widths and larger wave widths, since the realization of smaller structure widths, for one thing, uses more material, and, for another, reduces the flexibility or, respectively, adjustability, so that for different corrugated pipes a common suitable convergent beam of rays can be formed.

Because the transceiver units are designed with a fixed measuring distance of the transceiver units to the axis of symmetry, i.e., without active focusing means or, respectively, adjustment in a radial direction relative to the axis of symmetry, the THz measuring device can be realized at little cost and in a stabile manner. Thus, the measuring values are unambiguous and reproducible because they do not depend on the exact adjustment of length dimensions. Moreover, no respective adaptation to different corrugated pipes is required. It is possible, in particular, to transport and measure different corrugated pipes by means of a common THz measuring device without changing the settings.

In principle, an adjustment of the entire THz measuring device, i.e., the housing with the one or more THz transceivers can be carried out relative to the measured object, i.e., in the measuring plane, e.g., by means of a so-called cross table allowing a translational adjustment of the measuring device in the measuring plane relative to the measured object which is transported by a separate conveyor means.

According to an advantageous embodiment, a plurality of THz transceivers with equal focal length, in particular, with equal THz transceiver units, are arranged on the common housing in the circumferential direction around the measuring space and aligned towards the common axis of symmetry, whereby, advantageously, a fully circumferential measuring of a corrugated pipe contained therein, i.e., in particular, of corrugated pipes with different diameters and structure widths, is made possible.

According to an embodiment alternative hereto, one or more transceiver units are provided on the housing rotating in the circumferential direction, i.e. fully circumferential, or reversing within an angular range, i.e. swiveling back and forth, always with a constant measuring distance of the transceiver units to the axis of symmetry.

Thus, in principle, according to one embodiment, a method is provided in which during the measuring of the corrugated pipe the at least one transceiver unit rotates or reverses in the circumferential direction around the axis of symmetry, at a fixed measuring distance.

Accordingly, according to one embodiment, a measuring device is provided in which one or more transceiver unit(s) are arranged on the housing of the device circumferentially, in the circumferential direction, around the axis of symmetry, and a rotational drive is provided which is designed to continuously rotate the one or more transceiver unit(s) around the axis of symmetry, or swivel them back and forth reversing along a curve section around the axis of symmetry.

Preferably, the distances of opposite transceiver units are predetermined in advance or are determined in advance by a calibration measurement with an empty measuring space. Advantageously, in addition to the structure values also material data or, respectively, the refraction index of the material of the corrugated pipe is determined, in particular, on the basis of a calibration measurement with an empty measuring space and subsequent measuring with a corrugated pipe contained inside.

According to a further development, in addition to the transceiver units a distance measurement can be carried out by means of a detection means in which a position or a distance of an exterior surface of the corrugated pipe is detected, e.g., by means of a laser measuring device or, respectively, LIDAR, furthermore, also again by means of a radar, in particular an FMCW radar. Thus, this measurement merely serves to detect the exterior surface and the distance, not the above-described determination of the structures of the corrugated pipes contained inside. Such a detection merely determining the exterior surface of the corrugated pipe already allows for an unambiguous allocation and detection of structure positions. In principle, however, such an additional detection unit is not required.

According to the present disclosure, in particular, corrugated pipes with an interior diameter from 150 mm and up to an exterior diameter of 1,800 mm, or in an intermediate range in-between can be measured. According to an advantageous embodiment, corrugated pipes with an interior diameter between 150 mm up to an exterior diameter of 1,200 mm, or in an intermediate range are measured. According to an embodiment preferable hereto, corrugated pipes with an interior diameter from 500 mm up to an exterior diameter of 1,800 mm, or in an intermediate range are measured.

Thus, corrugated pipes with dimensions common in the industrial sector can be detected and precisely measured using a single THz measuring device. The determined wave and valley widths as well as wave heights can be compared to threshold values, and, upon exceeding a threshold value an error signal can be put out.

The present disclosure relates to a THz measuring method and a THz measuring device for measuring corrugated pipes (8-1, 8-2) with different diameters (D1, D2), wave widths (W1, W2) and valley widths (T1,T2), wherein a corrugated pipe (8-1, 8-2) is transported along a transport direction (F) along an axis of symmetry (A)

through a measuring space (9) of a THz measuring device (1) and continuously measured in a measuring plane perpendicular to the axis of symmetry (A), at least one transceiver unit (2) emits THz radiation (5) along its optical axis (B) into the measuring space (9) in the direction towards the axis of symmetry (A), focuses it as a convergent beam of rays (15) and detects reflected THz radiation, where a focal length (f) of the beam of rays (15) is smaller than a measuring distance (L) of the transceiver unit (2) in relation to the axis of symmetry (A), where the beam of rays (15) from the measuring spot (6) in such a manner that the beam of rays (15) is focused temporarily on valleys (11) and waves (10) of the transported corrugated pipe (8-1, 8-2) without covering the adjacent waves (10) and valleys (11), layer thicknesses of the waves (10) and valleys (11) of the corrugated pipe (8-1, 8-2) transported through the measuring space (9) along the transport direction (F) are determined.

The invention claimed is:

1. A THz measuring method for measuring corrugated pipes, the method comprising a corrugated pipe is transported along a transport direction along an axis of symmetry through a measuring space of a THz measuring device and continuously measured in a measuring plane perpendicular to the axis of symmetry, at least one transceiver unit emits THz radiation along its optical axis into the measuring space in the direction towards the axis of symmetry, focuses the same as a convergent beam of rays and detects reflected THz radiation, wherein a focal length of the beam of rays is smaller than a measuring distance of the transceiver unit in relation to the axis of symmetry, wherein the beam of rays forms the measuring spot in such a way that the beam of rays is temporarily focused on valleys and waves of the transported corrugated pipe without covering the adjacent waves and valleys, and wherein layer thicknesses of the waves and valleys of the corrugated pipe transported through the measuring space along the transport direction are determined.

2. The method of claim 1, wherein one or more of the following layer thicknesses are determined:

a valley wall thickness of the valleys of the corrugated pipe, an exterior wall thickness of a wave or wave wall thickness of the waves of the corrugated pipe, an interior wall thickness of a wave of the waves of the corrugated pipe, and/or a wave height of the waves.

3. The method of claim 1, wherein, one or more of the following characteristics are determined:

a valley width, a wave width, a wave height, an interior diameter, an exterior diameter, a refraction index of the materials of the corrugated pipe.

4. The method of claim 1, wherein the determined layer thicknesses are compared to reference values, and, upon determining a deviation from threshold values, an error signal is put out.

5. The method of claim 1, wherein at least two corrugated pipes are transported through the same THz measuring device and measured, where always the one or more characteristic(s) of the corrugated pipes transported through the measuring space along the transport direction are determined, wherein the measuring distances of the transceiver units remain unchanged in relation to the axis of symmetry between the measurements of the two corrugated pipes and in the measurements and wherein a smaller first corrugated pipe exhibits a smaller first diameter, a smaller first valley width, a smaller first wave width and a smaller first wave height than a larger second corrugated pipe.

6. The method of claim 1, wherein corrugated pipes with the following dimensions are measured:

interior diameter of larger than/equal to 150 mm, in particular 500 mm, exterior diameter 1.200 mm to 1.800 mm, preferably with wave widths of 25 mm to 180 mm and/or valley widths of 10 mm to 60 mm.

7. The method of claim 1, wherein a plurality of transceiver units are provided, arranged fixed around the measuring space and/or the corrugated pipe and not being adjusted in relation to the corrugated pipe and/or a housing of the THz measuring device during measuring of the corrugated pipe, in particular for a fully circumferential measuring of the corrugated pipe.

8. The method of claim 1, wherein during measuring the corrugated pipe the at least one transceiver unit rotates or reverses in the circumferential direction around the axis of symmetry, at a fixed measuring distance.

9. A THz measuring device for measuring corrugated pipes, the THz measuring device comprising:

at least one transceiver unit comprising a THz transceiver and a lens for focusing a THz radiation emitted from the THz transceiver and detecting reflected radiation, a housing enclosing a measuring space to receive the corrugated pipes with an axis of symmetry, the transceiver unit being arranged on the housing in a fixed or adjustable manner at a fixed measuring distance to the axis of symmetry, and the transceiver unit further being designed to emit the THz radiation along an optical axis, receive reflected radiation, and form a measuring signal, a controller means designed to receive the at least one measuring signal from the at least one transceiver unit as a function of time and to determine from the at least one measuring signal layer thicknesses of the waves and valleys of the corrugated pipe transported through the measuring space along the transport direction, wherein the transceiver unit is designed and arranged in such a way that it emits the THz radiation as a convergent beam of rays with a focal length that is smaller than the measuring distance of the transceiver unit to the axis of symmetry.

10. The THz measuring device of claim 9, wherein the controller means is designed to determine one or more of the following layer thicknesses:

a valley wall thickness of the valleys of the corrugated pipe;

an exterior wall thickness of a wave or wave wall thickness of the waves of the corrugated pipe;

an interior wall thickness of a wave of the waves of the corrugated pipe; and/or a wave height of the waves in relation to the valleys.

11. The THz measuring device of claim 9, wherein a ratio of focal length to measuring distance lies degree at least 60 percent, preferably at least 75 percent, in particular at least 80 percent, and/or a convergence angle of 1 degree to 5 degrees, e.g., 1 degree to 4 degrees, preferably 1.5 degrees to 3 degrees, e.g., in the range from 1.8 to 2.3 degrees, is formed.

12. The THz measuring device of claim 9, wherein a plurality of transceiver units are arranged in a fixed manner on the common housing in the circumferential direction around the measuring space and each aligned with their optical axes towards the axis of symmetry, in particular for fully circumferentially measuring a corrugated pipe contained inside in a common measuring plane, the plurality of transceiver units have an equal focal length, preferably are designed as identical transceiver units and wherein a common controller means is provided for receiving the measuring signals and determining the at least one characteristic.

13. The THz measuring device of claim 9, wherein the lens of the at least one transceiver unit is provided to be made of a material with a refraction index for the THz radiation of larger than 1.7, e.g., in a range from 1.7 to 2.1, in particular 1.7 to 2.0, preferably 1.8 to 2.0, in the frequency range of the emitted THz radiation.

14. The THz measuring device of claim 9, wherein the lens is designed one-piece with a convex exterior surface and from a homogenous material, e.g., a material containing silicon dioxide, in particular quartz glass.

15. The THz measuring device of claim 9, wherein the THz radiation lies in a range of Gigahertz and/or Terahertz radiation, in particular, within a frequency range between 10 GHz and 50 THz, in particular 50 GHz and 10 THz, e.g., 50 GHz and 4 THz, the THz transceiver being designed to emit the THz radiation temporally continuous and/or frequency modulated and/or pulsed, in particular as an FCMW radar.

16. The THz measuring device of claim 9, wherein the controller means detects a structure of a corrugated pipe contained inside in the measuring plane perpendicular to the axis of symmetry of one or more of the following elements: a wave, a valley, a fitting, in particular, as a receptacle of a ring seal, or an external sleeve.

17. The THz measuring device of claim 9, wherein the beam of rays and the controller means are designed to, measure and determine at least one smaller first corrugated pipe with a smaller first diameter, smaller first valley width, smaller first wave width and smaller first wave height, and a larger second corrugated pipe with a larger second diameter, larger second valley width, larger second wave width and larger second wave height, at a fixed measuring distance of the transceiver unit in relation to the axis of symmetry in both measurements.

18. An arrangement consisting of the THz measuring device of claim 9 and the corrugated pipe contained inside.

19. An arrangement comprising the THz measuring device of claim 9 and the corrugated pipe contained inside.

20. A method of manufacturing a corrugated, wherein
the corrugated pipe is extruded and formed by means of a corrugator with waves and valleys by means of a corrugator,
the corrugated pipe is subsequently measured by means of a method according to claim 1 and a THz measuring device,
wherein the THz measuring device comprises
at least one transceiver unit comprising a THz transceiver and a lens for focusing a THz radiation emitted from the THz transceiver and detecting reflected radiation,
a housing enclosing a measuring space to receive the corrugated pipes with an axis of symmetry,
the transceiver unit being arranged on the housing in a fixed or adjustable manner at a fixed measuring distance to the axis of symmetry, and the transceiver unit further being designed to emit the THz radiation along an optical axis, receive reflected radiation, and form a measuring signal,
a controller means designed to receive the at least one measuring signal from the at least one transceiver unit as a function of time and to determine from the at least one measuring signal layer thicknesses of the waves and valleys of the corrugated pipe transported through the measuring space along the transport direction,
wherein the transceiver unit is designed and arranged in such a way that it emits the THz radiation as a convergent beam of rays with a focal length that is smaller than the measuring distance of the transceiver unit to the axis of symmetry and
wherein the controlling of the extruders and/or corrugator is regulated depending on the values determined by the measuring.

* * * * *